United States Patent [19]

Lester

[11] 4,140,199
[45] Feb. 20, 1979

[54] MOBILE CRANE

[75] Inventor: Robert J. Lester, Cleadon, nr. Sunderland, England

[73] Assignee: Coles Cranes Limited, Sunderland, England

[21] Appl. No.: 772,885

[22] Filed: Feb. 28, 1977

Related U.S. Application Data

[63] Continuation of Ser. No. 618,858, Oct. 2, 1975, abandoned.

[30] Foreign Application Priority Data

Oct. 5, 1974 [GB] United Kingdom ............... 43295/74

[51] Int. Cl.² ............................................. B62D 5/08
[52] U.S. Cl. .................................... 180/77 S; 180/140
[58] Field of Search ...................... 180/77 S, 140, 132; 280/91

[56] References Cited

U.S. PATENT DOCUMENTS

| | | | |
|---|---|---|---|
| 2,874,792 | 2/1959 | Scheuerpflug | 180/140 |
| 3,195,913 | 7/1965 | Hallsworth | 180/77 S X |
| 3,265,149 | 8/1966 | Schuetz | 180/77 S |
| 3,856,102 | 12/1974 | Queen | 180/140 |
| 4,016,948 | 4/1977 | Kuester | 180/132 |

*Primary Examiner*—Joseph F. Peters, Jr.
*Assistant Examiner*—R. Schrecengost
*Attorney, Agent, or Firm*—Sughrue, Rothwell, Mion, Zinn and Macpeak

[57] ABSTRACT

A rough terrain mobile crane in which the operator's control cab is mounted on a rotatable superstructure has all the controls grouped in the cab including a mechanical, preferably power assisted, steering system mechanically engagable when the cab is in a road travel position, an hydraulic steering system is alternatively engageable for on-site use and includes a separate directional control valve for steering road wheels on one of the axles, and utilizing the power assisted part of the mechanical steering.

8 Claims, 2 Drawing Figures

MOBILE CRANE

This is a Continuation, of application Ser. No. 618,858, filed Oct. 2, 1975 and now abandoned.

BACKGROUND OF THE INVENTION

This invention relates to mobile cranes of the type known as "rough terrain" cranes in which the operator's cab is mounted on a crane superstructure rotatably carried on the vehicle chassis, and more especially to a steering control system therefor.

Controls for the craning operation are passed through a rotary joint at the rotatable axis of the superstructure and an hydraulically operated steering system is employed so that control is exercized through hydraulic hoses as is the case for boom and crane cable operation.

For use on highways in driving the crane from place to place a fail-safe mechanical steering linkage is required in case of hydraulic power failure; this presents a problem one solution to which has been the provision of rough-terrain cranes having two separate control cabs, one mounted on the chassis with vehicle controls only for use in moving the crane and sufficient duplicated hydraulic controls being provided in a crane control cab for low-speed manoeuvering of the crane in on-site use. Such cranes necessarily have a long wheelbase for permitting rotation of the superstructure with clearance from the chassis control cab.

One of the main difficulties arising in the alternative provision of a mechanical steering linkage engagable for road travel, together with an hydraulic steering system for on-site use, is that the velocity ratio between the steering wheel rotation and steering actuators has a linear relationship in hydraulic operation whereas the ratio between steering wheel rotation and mechanical steering drag link movement is non-linear due to the geometry of a mechanical steering box and drop arm. Proposals for overcoming this difficulty by the use of pressure release valves in the hydraulic system for limiting the build up of excessive pressure engendered when combined with a mechanical linkage, or provision of an hydraulic fluid bypass of the primary hydraulic steering unit are not entirely satisfactory in practice in eliminating differential pressures affecting the steering and also lead to undesirable complications of the hydraulic system.

SUMMARY OF THE INVENTION

An object of the invention is to provide a rough terrain crane in which steering controls are grouped in the cab whilst overcoming the problem of providing mechanically linked steering for road travel and providing hydraulically operated steering for on-site use.

According to the present invention a mobile crane in which the operator's cab is mounted on superstructure rotatably carried on the vehicle chassis of the crane comprises mechanical steering linkage mechanically engagable with cab-mounted mechanical steering control including a steering wheel when the cab is rotated to a road travel position and an hydraulic steering system connected to road wheels carried on at least two axles, and is also characterised in that part of the hydraulic steering system operatively connected to road wheels on one of the axles is disengageable from the steering wheel for road travel, a separate directional valve is provided with a control in the cab and part of the hydraulic steering system operatively connected to road wheels on another of the axles is operatively connected to the separate directional control valve for effecting four wheel manoeuvering in on-site use.

A conventional power assisted mechanical steering system including a secondary hydraulic steering unit is preferably provided for use in road travel and is preferably engageable by a common control member also connected to a steering coupling for simultaneous disengagement from the steering wheel of a primary hydraulic steering system for road use. A slidable coupling e.g. splined shaft, may be provided in the steering column for disengaging the mechanical steering system under the control of a cab-mounted lever connected to the slidable coupling and to the steering coupling which is preferably mechanical e.g. gear wheels respectively of the primary hydraulic steerig system and on the steering column, permitting the primary hydraulic steering system to "free wheel" in its disengaged condition for road travel, or the road wheels steered by it to be locked in the "straight ahead" position, without generation of excessive forces and without any need for the provision of pressure relieving valves or bypass conduits and attendant difficulties.

Interlocks should be provided for preventing inadvertent actuation of the crane rotation mechanism while the mechanical steering system is engaged and a mechanical interlock with a crane rotation locking mechanism of a type commonly used on such cranes may be provided.

The mechanical steering system may be connected to actuate either of the steerable sets of road wheels on the respective axles and the disconnection of the primary hydraulic steering unit for road travel also enables the primary hydraulic steering for crane operation readily to be connected to the road wheels on the other axle to that used for steering in road travel, without the difficulties referred to.

An auxiliary steering control, e.g. a lever or pneumatic switch, may in the latter case be connected to the secondary hydraulic steering unit for four-wheel maneuvering such as tight steering or crab steering non-site use.

A changeover valve may be provided in the primary hydraulic steering system for reversing the steering sense when the crane superstructure is rotated to face in the opposite direction e.g. in on-site use.

This arrangement is particularly advantageous for the high speed rough terrain crane incorporating a superstructure cab mountable in two alternative positions for road travel and crane operation respectively.

BRIEF DESCRIPTION OF THE DRAWINGS

The invention will be further described by way of example with reference to the accompanying drawings in which.

DETAILED DESCRIPTION OF THE INVENTION

Figure 1:
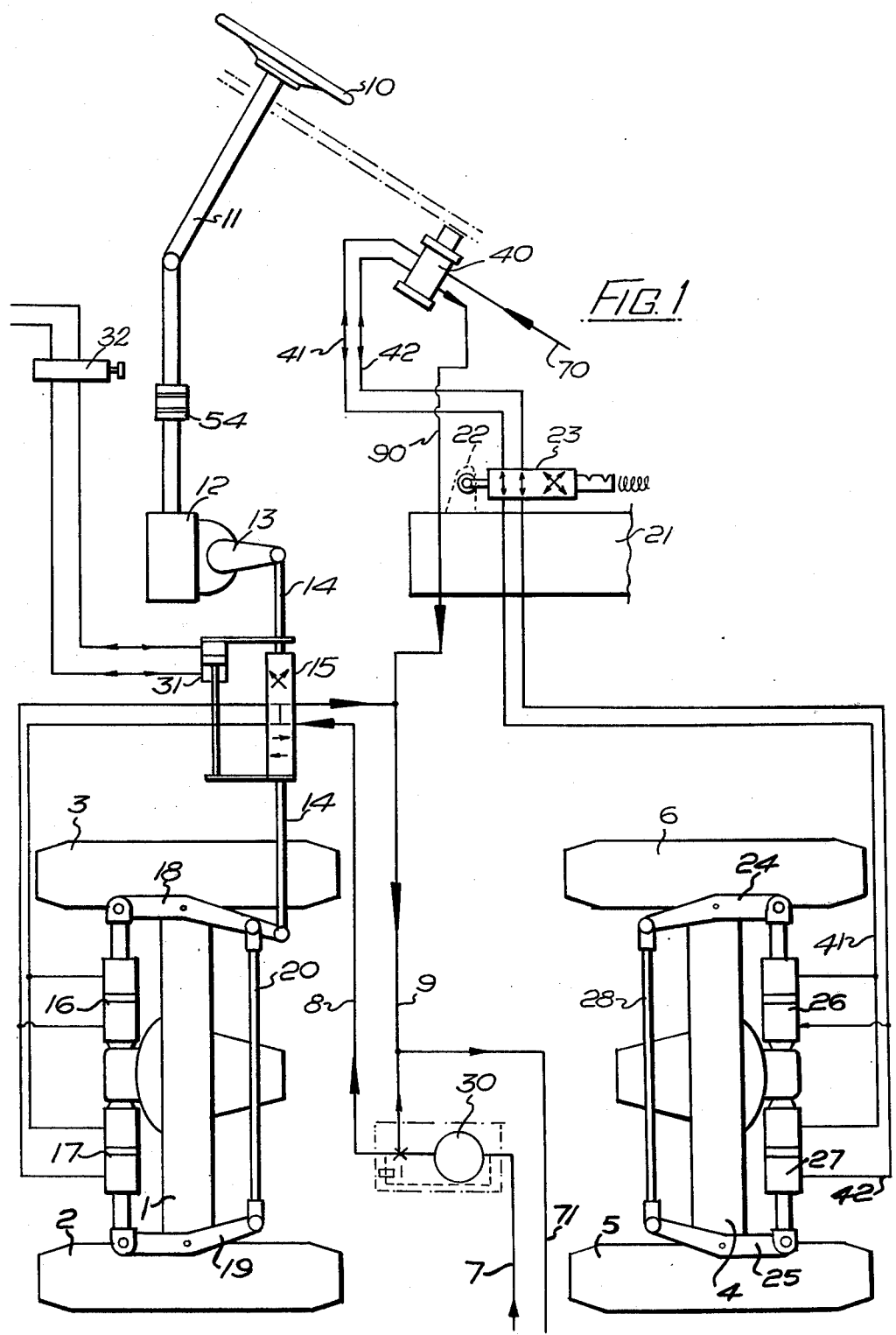
FIG. 1 illustrates a disengaged primary hydraulic steering system applied to the rear road wheels and a disengageable mechanical power assisted steering system with a secondary hydraulic steering unit, alternatively operable by a separate pneumatic valve, applied to the front road wheels of a rough terrain mobile crane in accordance with the invention

A steering wheel 10 carried on a steering column 11 is disengageably connected through a steering box 12 and drop arm 13 to a power assisted steering unit including a steering link 14 having a secondary hydraulic control valve 15 operatively connected to steering rams 16, 17 on the front axle 1 with steering arms 18, 19 coupled by drag-link 20 for steering the front wheels 2, 3 mechanicaly with power assistance from servo pump 30 connected to control valve 15 in linear response to actuation of the steering wheel 10.

The front wheels 2, 3 for road travel become the rear wheels in on-site use for crane operation when control valve 15 is operated by a pneumatic cylinder 31, having control means 32 located in a cab. The steering link 14 is a two piece member, the upper end being connected to the inner core of spool valve 15 and the lower part being connected to the outer cylinder of spool valve 15.

Hydraulic fluid passes from servo steering pump 30 through connection 8 to the secondary hydraulic control valve 15 from a reservoir connection 7. Hydraulic fluid under pressure is also supplied from the main hydraulic system which is independent of pump 30 to a primary hydraulic steering unit 40 with return connections 90, 9 and 71 to the reservoir. When the control valve is positioned to block the flow of fluid from pump 30 through connection 8 the fluid is by-passed through lines 9 and 71 back to the tank. The primary hydraulic system comprises connection lines 41, 42 to steering rams 26, 27 on the rear axle 4 with steering arms 24, 25 coupled by drag-link 28 for steering the rear wheels 5, 6 hydraulically in on-site use.

The steering controls are carried in a superstructure mounted control cab 29 rotatable on the chassis 21 with a projecting part 22 arcuately disposed forwardly of the axis of rotation, through which the hydraulic lines 41, 42 and the mechanical connection to steering box 12 pass. A changeover valve 23 is provided in the hydraulic lines 41, 42 cam operable by the chassis part 22 for preserving the sense of hydraulic steering when the crane superstructure is rotated through 180°, i.e. in the position illustrated if the primary hydraulic system were connected to the steering — which it is not — left hand down on the steering wheel 10 would cause rear wheels 5, 6 to move in a clock wise direction.

In FIG. 1 the steering mechanism is shown with the rear wheels 5, 6 locked in the straight ahead position for road travel steering control by power assisted steering of wheels 2, 3. During road use, the cylinder 31 is vented so that the upper and lower portions of link 14 are permitted to move freely with respect to one another. Turning the steering wheel counter clockwise cause upper portion of link 14 to be raised, thus moving the through flow portion of the core of valve 15 into registration with the input and output ports of the external cylinder of the valve. Pressurized fluid is then supplied to the upper halves of rams 16 and 17 to rotate the wheels 2, 3 counter clockwise, until the neutral channels of the core are again brought into registration with the inflow and outflow ports in the valve cylinder. When the steering wheel 10 is rotated clockwise, the inner core of valve 15 is forced downwardly until the crossflow portion thereof is in registration with the ports in the valve cylinder, thereby routing fluid to the lower halves of rams 16 and 17 and turning the wheels 2, 3 clockwise. Thus, power assisted steering is achieved.

Figure 2:
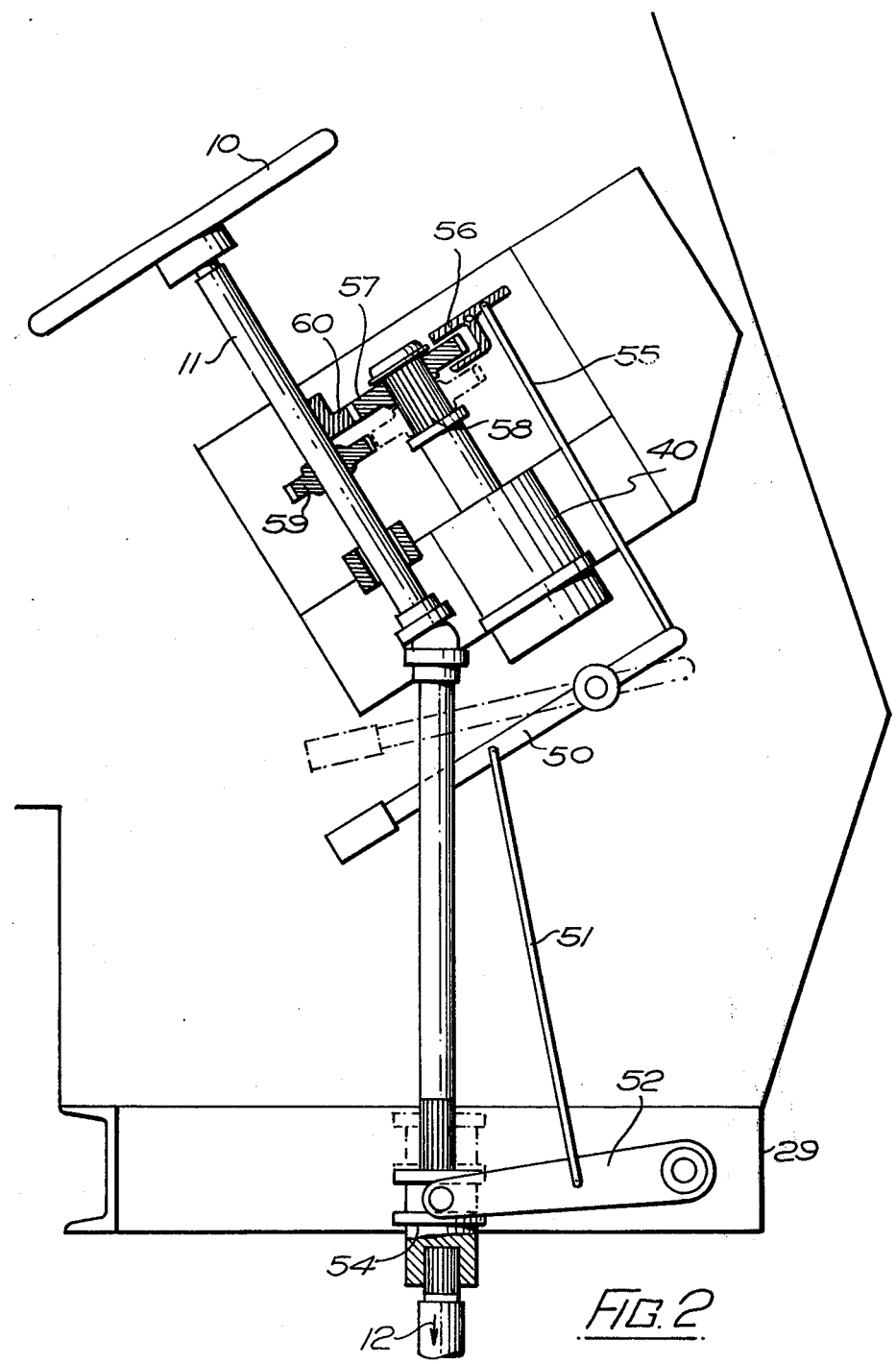
FIG. 2 is a side elevation partly in section of the steering column and interconnected coupling release device of the crane of FIG. 1.

For craning operation in on-site use the cab is rotated and a coupling control lever 50 is manually operated as shown in chain-dotted lines in FIG. 2 causing link 51 is raise arm 52 and consequently collar 53 with slidable splined coupling 54 disengaging steering column 11 from steering box 12. Simultaneously lever 50 moves link 55 and consequently guide yoke 56 to slide a splined gear 57 mounted on the impeller 58 of primary steering unit 40 into meshing engagement with gear 59 on the steering column, thus engaging the primary hydraulic steering system for operation of wheels 5, 6.

In craning operation in on-site use the control cab 29 faces generally to the rear and wheels 5, 6 effectively become the front wheels for normal purposes. When valve 23 is withdrawn from chassis part 22 the changeover valve is spring operated to reverse the controls 41, 42 shown in the lowerpart of FIG. 1. i.e. right hand down on the steering wheel 10 directs road wheels 5, 6 in a clockwise direction.

In the crane illustrated the primary hydraulic steering system is locked with the wheels 5, 6 in the straight ahead position by meshing engagement of splined gear wheel 57 with dog gear 60 secured as a fixed steering column support during road travel; the gear wheels 57, 59 are positioned for engagement before complete disengagement of splined coupling 54 for providing continuity of steering control when operating lever 50.

When very tight steering or "crab" steering is desired, the control means 32, which may comprise a 3-position switch, is actuated by the operator to fix the piston in the cylinder 31 at a predetermined position so that the desired steering is achieved. For example, if tight steering is desired, the pneumatic cylinder 31 is pressurized to bring the direct-flow ports of the core of valve 15 into registration with the ports in the cylinder. Due to the pressure maintained in the pneumatic cylinder 31, the link 14 now becomes a solid member so that the direct-flow ports of the valve 15 are always in registration. Similarly, when crab steering is desired, the pneumatic cylinder 31 is pressurized so that the crossflow ports of valve 15 are in registration.

In cases where the same road wheels, e.g. 2, 3 are connected for steering both for road travel by mechanical power assisted steering and where this is disconnected, for on-site use by the primary hydraulic steering system, then the road wheels 5, 6 are pinned by an inter-lock in the straight ahead position and the gear wheel 57 allowed to "free wheel" during road steering through steering box 12.

I claim:

1. A steering arrangement for a mobile crane in which the operator's cab is mounted on a superstructure rotatably carried on the vehicle chassis of the crane, comprising:

a hydraulic steering system, including a primary hydraulic unit, for controlling the steering of road wheels on a first axle;

a power-assisted mechanical steering system, including a secondary hydraulic unit, for controlling the steering of road wheels on a second axle;

cab-mounted mechanical steering control means including a steering wheel;

means for alternately coupling said steering wheel to one of said hydraulic and power-assisted mechanical steering systems;

control means operable from said cab; and a separate directional valve operated by said control means to selectively couple said secondary hydraulic unit to said road wheels on said second axle when said steering wheel is coupled to said primary hydraulic unit.

2. A mobile crane as claimed in claim 1 wherein said mechanical steering control means further comprises a steering column and wherein said means for alternately coupling comprises a common control member and a mechanical coupling between said steering column and said primary hydraulic unit, said steering column comprising a discontinuous splined shaft with a slidable coupling sleeve yoked to said common control member to which said mechanical coupling is also connected.

3. A mobile crane as claimed in claim 2 in which the primary hydraulic unit is permitted to free wheel during engagement of the mechanical steering system.

4. A mobile crane as claimed in claim 2 in which the separate directional control valve is connected to the secondary hydraulic unit for use in on-site use in unit independently of the primary hydraulic steering.

5. A mobile crane as claimed in claim 4 in which said mechanical coupling is lockable upon its disengagement in order to prevent said primary hydraulic unit from free wheeling during road travel.

6. A mobile crane as claimed in claim 5 in which a gear wheel slidable on an impeller of the primary hydraulic unit is coupled to the common control member and alternatively meshed with a gear wheel on the steering column and a fixed dog.

7. A mobile crane as claimed in claim 1 in which a changeover valve is provided in the hydraulic steering system for reversing the steering sense of the road wheels on said first axle when the crane superstructure is rotated.

8. A mobile crane as claimed in claim 7 in which the changeover valve is cam operated by a projection carried by the vehicle chassis.

* * * * *